United States Patent
Morath

(10) Patent No.: US 7,665,620 B2
(45) Date of Patent: Feb. 23, 2010

(54) CRANE

(75) Inventor: Erwin Morath, Lauterach (DE)

(73) Assignee: Liebherr-Werk Ehingen GmbH, Ehingen/Donau (DE)

(*) Notice: Subject to any disclaimer, the term of this patent is extended or adjusted under 35 U.S.C. 154(b) by 159 days.

(21) Appl. No.: 11/635,420

(22) Filed: Dec. 7, 2006

(65) Prior Publication Data
US 2007/0156280 A1  Jul. 5, 2007

(30) Foreign Application Priority Data

Dec. 8, 2005 (DE) ............... 20 2005 019 225 U
Dec. 30, 2005 (DE) ............... 20 2005 020 462 U

(51) Int. Cl.
*B66C 13/44* (2006.01)

(52) U.S. Cl. ............ 212/276; 212/284; 212/290

(58) Field of Classification Search ........... 212/276, 212/284, 290
See application file for complete search history.

(56) References Cited

U.S. PATENT DOCUMENTS

| | | | | |
|---|---|---|---|---|
| H1191 H | * | 6/1993 | Hutchison et al. ............ 91/459 |
| 5,293,900 A | * | 3/1994 | Karbassi et al. ............ 137/554 |
| 5,890,870 A | * | 4/1999 | Berger et al. ............ 414/699 |
| 6,131,097 A | * | 10/2000 | Peurach et al. ............ 707/102 |
| 6,550,562 B2 | * | 4/2003 | Brandt et al. ............ 180/333 |

FOREIGN PATENT DOCUMENTS

| | | |
|---|---|---|
| DE | 90 10 967 | 10/1990 |
| DE | 195 05 845 | 9/1995 |
| DE | 196 19 419 | 11/1997 |
| DE | 102 31 902 | 2/2004 |
| DE | 102 33 870 | 2/2004 |
| EP | 0357274 | 3/1990 |
| EP | 0402813 | 12/1990 |
| EP | 0894901 | 2/1999 |
| GB | 2360500 | 9/2001 |

* cited by examiner

*Primary Examiner*—Thomas J. Brahan
(74) *Attorney, Agent, or Firm*—Steven S. Rubin; Dilworth & Barrese

(57) ABSTRACT

The present invention relates to a crane, preferably a truck crane, comprising a plurality of crane elements which are movable by actuators, a crane control unit for controlling and/or monitoring the movement of the crane elements, and at least one actuating switch for actuating the actuators. In accordance with the invention, the crane is characterized in that in the at least one actuating switch a logic module is integrated, by which the actuators can be driven directly corresponding to a respective switch movement, and the crane control unit can be connected with the logic module by a data transmission connection.

29 Claims, 5 Drawing Sheets

CRANE

BACKGROUND OF THE INVENTION

The present invention relates to a crane, preferably a truck crane, comprising a plurality of crane elements which are movable by actuators, a crane control unit for controlling and/or monitoring the movement of the crane elements, and at least one actuating switch for actuating the actuators.

Modern truck cranes usually are provided with multiaxially tiltable control sticks, sometimes also referred to as joysticks, for controlling the diverse crane elements and/or actuators provided for the same, such as the slewing gear, the hoist gear, the telescoping drive or the luffing drive. A sensor unit usually is associated to the control sticks, by means of which the central crane control detects movements of the respective control stick, whereupon the central crane control unit converts the movement signals into control signals for the actuators. In other words, the positioning movement of the control sticks is converted into control commands for the actuators via the central crane control. The actuators frequently are of the hydraulic type and are controlled via hydraulic valves, whose movement is controlled via the control commands generated by the crane control.

In practice, such crane controls have turned out to be quite useful, but nevertheless they still need improvement in some aspects and for some applications. In particular, it would be desirable to reduce the costs of such crane controls without having to do without the various functionalities. In addition, it would be desirable to accelerate the conversion of the switch movements into actual crane movements.

Therefore, it is the object underlying the present invention to create an improved crane as mentioned above, which overcomes the disadvantages of the prior art and develops the latter in an advantageous way. Preferably, a less expensive crane control should be created, which provides for a rapid conversion of the switch movements into crane movements and offers a high safety.

In accordance with the invention, this object is solved by a crane as described herein. Preferred aspects of the invention are also described herein.

Thus, it is proposed to provide the at least one actuating switch itself with sufficient intelligence, in order to achieve an autonomous control of the respective actuators by the actuating switch alone. The actuating switch is made sufficiently intelligent, in order to control autonomously and execute a corresponding control program. In accordance with the invention, a logic module is integrated in the actuating switch, by means of which the actuators can be actuated directly by the actuating switch corresponding to a respective switch actuation. This allows a control of the actuators without interconnection of the central crane control. For this purpose, the logic module has at least one control output, via which control commands generated in the actuating switch can directly be provided to the actuators. The crane control unit merely acts as a superordinate control, which through a data transmission connection can be connected with the logic module provided in the actuating switch, in order to perform superordinate control tasks. The arrangement of the logic module in the actuating switch and the direct activation of the actuators without detour via the central crane control, can result in a lower price of the control system, in so far as various components need not be provided twice. In addition, safety is increased, as it is not necessary that a chain of components between the actuating switch and the respective actuator is present and works. The speed of conversion, with which the movements of the actuating switch are converted into crane movements, is also increased, as the control signal comes directly from the switch and need not go first through the central crane control.

As an actuating switch, there is in particular provided a multiaxially tiltable control stick which has a bus connection, in order to permit communication of the integrated logic module with the superordinate central crane control unit. It will be appreciated that a plurality of such actuating switches can be provided, in order to be able to control various actuators for various crane elements. For instance, two of such multiaxially tiltable control sticks can be provided, one of which controls for instance a slewing gear as well as a hoist gear of the crane, and the other one controls for instance the luffing gear, the boom telescoping in and out, and possibly another hoist gear.

Advantageously, the at least one actuating switch including its logic module and the bus system between switch and superordinate crane control computer as well as the drive between switch and actuator are of the redundant and preferably diversitary type. In particular, the logic integrated in the at least one actuating switch is of the diversitary type. For this purpose, the logic module can include two different types of processor, which likewise can incorporate different types of software. With regard to the bus system, which in accordance with a development of the invention is of the two-channel or multichannel type, there is advantageously likewise provided a diversitary configuration, which can for instance be implemented by an LSB bus and a CAN bus. In principle, a homogeneous configuration of the logic module integrated in the switch and/or of the bus system between switch and superordinate crane control would also be possible. The redundant and diversitary configuration, however, not only provides an increased safety, but also a better error detectability, as failures always can be traced back unambiguously.

By means of the connection of the superordinate crane control unit to the actuating switch via the aforementioned bus system, the crane control unit can provide diverse superordinate control functions which go beyond the functions provided by the logic module integrated in the switch and/or activate, modify or complete the latter. In particular, any parametrization of the respective actuating switch is possible. On the one hand, the signal generation effected by the logic module can be parametrized to the effect that a backlash of the actuating switch is avoided and 100% switch movement are always converted into 100% crane element movement. On the other hand, there can also be achieved a parametrization of the actuator travel, which differs from a 1:1 conversion of the switch movement into crane element movements. For instance, if the lover is moved abruptly, a smooth movement of the activated crane element can be achieved via an integrator. Alternatively or in addition, the crane control can also provide a reassignment of the control outputs of the logic module, so that for instance according to the individual desire of the end user the X-axis of the actuating switch can be defined as a control axis for the luffing gear and for another end user as a control axis for the hoist gear.

In accordance with a development of the invention, the at least one actuating switch can include a vibrator, which provides a feedback as to the response of the crane movement, in order give a crane operator a feeling as to when and to what extent the lever movement is converted into a crane movement. In particular, the vibrator in the actuating switch can be configured so as to be driveable and parametrizable by the superordinate crane control unit via the bus system. Via the central crane control it is determined, for instance, how strong the maximum vibration is or how fast the vibration is increasing to the maximum value.

In accordance with a development of the invention, the allocation of the axes of the actuating switch can be parametrized by the central crane control via the bus system. The functionality of the lever thereby can be modified, so that additional control tasks can be performed by the same actuating switch. The control outputs of the switch do not necessarily act only on the valves of the actuators, which usually should be controlled by the actuating switch, but the signals generated via the corresponding control outputs of the switch can be withdrawn from the central crane control unit and be used for other control tasks. Thus, the central control unit, for instance upon actuation of a corresponding change-over switch, can use the control outputs of the actuating switch, which are actually provided for telescoping out the boom, for extending sliding beams for supporting the undercarriage.

Advantageously, a ramp control of the proportional outputs of the switch can be driveable and or parametrizable by the superordinate crane control unit via the bus system in accordance with another preferred embodiment of the invention. In particular, in accordance with a development of the invention, the activation of the end stages, which ultimately also provide for an actuation of the valves of the hydraulic actuators, can also be effected by the crane control means, i.e. the control commands are rerouted via the crane control. On the one hand, this allows e.g. a reassignment of the end stage outputs. On the other hand, the magnetic fluxes, the characteristics or the so-called dither activation can be influenced and parametrized via the bus system. Diverse characteristics can be stored in the logic module of the actuating switch. Via the crane control unit, the respective characteristic desired is activated. By means of the crane control, an integrator can also be interconnected via the bus system, which for instance converts a rupture of the actuating switch as desired into control commands for driving the actuators.

In accordance with a development of the invention, the logic module in the at least one actuating switch has a specified default setting, which for instance in the case of a failure of the central crane control provides for an operation of the actuators independent of the main computer. Upon failure of the bus system and/or the central crane control, the actuating switch can operate the crane autonomously. By means of the specified default setting, it can be ensured that in the manner of an emergency operation only quite slow crane movements or crane movements in a certain direction are possible. It can be provided, for instance, that if a signal from the bus system or from the central crane control is missing, only the slowest stage of movement can be activated. From the control logic stored in the logic module, a parametrization is selected for the emergency operation.

In accordance with a development of the invention, control commands are possible both from the actuating switch and from the superordinate crane control unit for actuating the actuators. Advantageously, the smallest control command has priority, whereby functions such as limitation of the working range, performance limitation and any hydraulic proportions and hence speeds of the individual movements can be influenced by the superordinate control. Expressed in other words this means that a limitation of the switch signals by the crane control unit can be provided. Thereby, an electronic load sensing can be achieved via a parametrization of the actuating switch. The superordinate crane control unit always limits the control signals output by the actuating switch for driving the actuators such that the available hydraulic power is appropriately distributed over the various loads. The actuation of the actuators is adapted to the available hydraulic power.

In accordance with a development of the invention, the control commands of the actuating switch and of the logic module integrated therein can be deactivated partly or completely. Via the bus system, the superordinate control can directly act on the actuators, by bridging the actuating switch or the logic integrated therein, so to speak. Radio controls and automatic controls can be implemented in this way. For this purpose, the superordinate control effects a disconnection of the logic module end stages from the actuators via the bus system, whereby the actuating switch is switched dead, so to speak. Signals from the crane control can be supplied directly to the actuators.

In accordance with a development of the invention, the logic module integrated in the at least one actuating switch is freely programmable. In particular, the logic module can include a corresponding microprocessor, into which any application programm can be loaded via the bus system. A host computer moves a control program into the logic module of the actuating switch, so that the same can execute a control algorithm as desired. In this way, autonomous control functions can be implemented in the actuating switch.

BRIEF DESCRIPTION OF THE DRAWINGS

The invention, will subsequently be explained in detail with reference to a preferred embodiment and associated drawings, in which.

DESCRIPTION OF THE PREFERRED EMBODIMENTS

Figure 2:
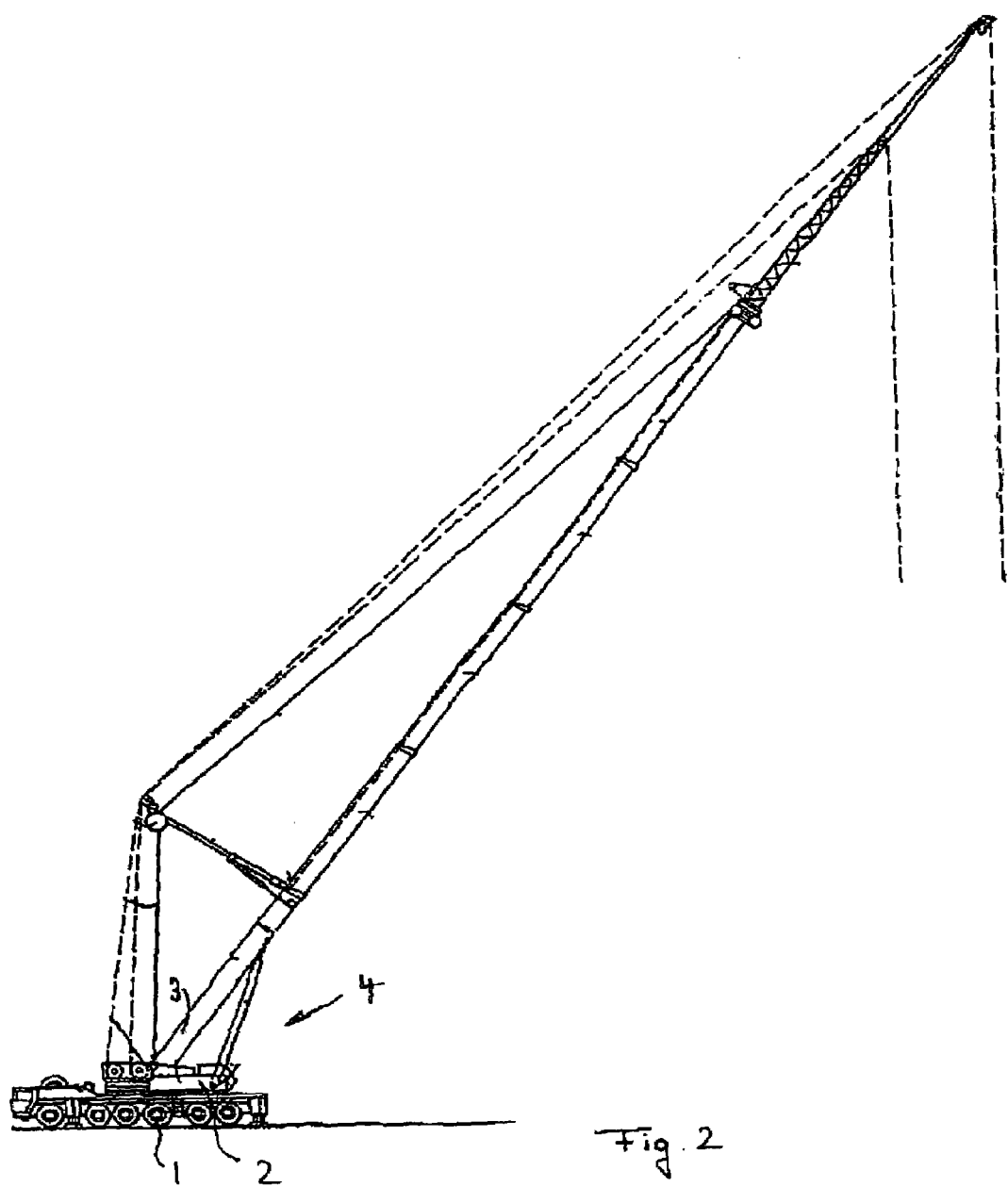
FIG. 2: shows a schematic representation of a truck crane, in which the control shown in FIG. 1 can be implemented.

In a manner known per se, the crane shown in FIG. 2 comprises an undercarriage 1 constituting a truck, on which an uppercarriage 2 is rotatably mounted about an upright axis. On the uppercarriage 2, a telescopic boom 3 is pivotally mounted for luffing up and down about a horizontal luffing axis, and on the boom 3 a non-illustrated folding tip can be provided. For moving the various crane elements; diverse actuators are provided, which are not illustrated specifically and preferably can be of a hydraulic type and can comprise a slewing gear, at least one hoist gear, a telescoping drive, a luffing drive as well as a folding-tip drive.

Figure 1:
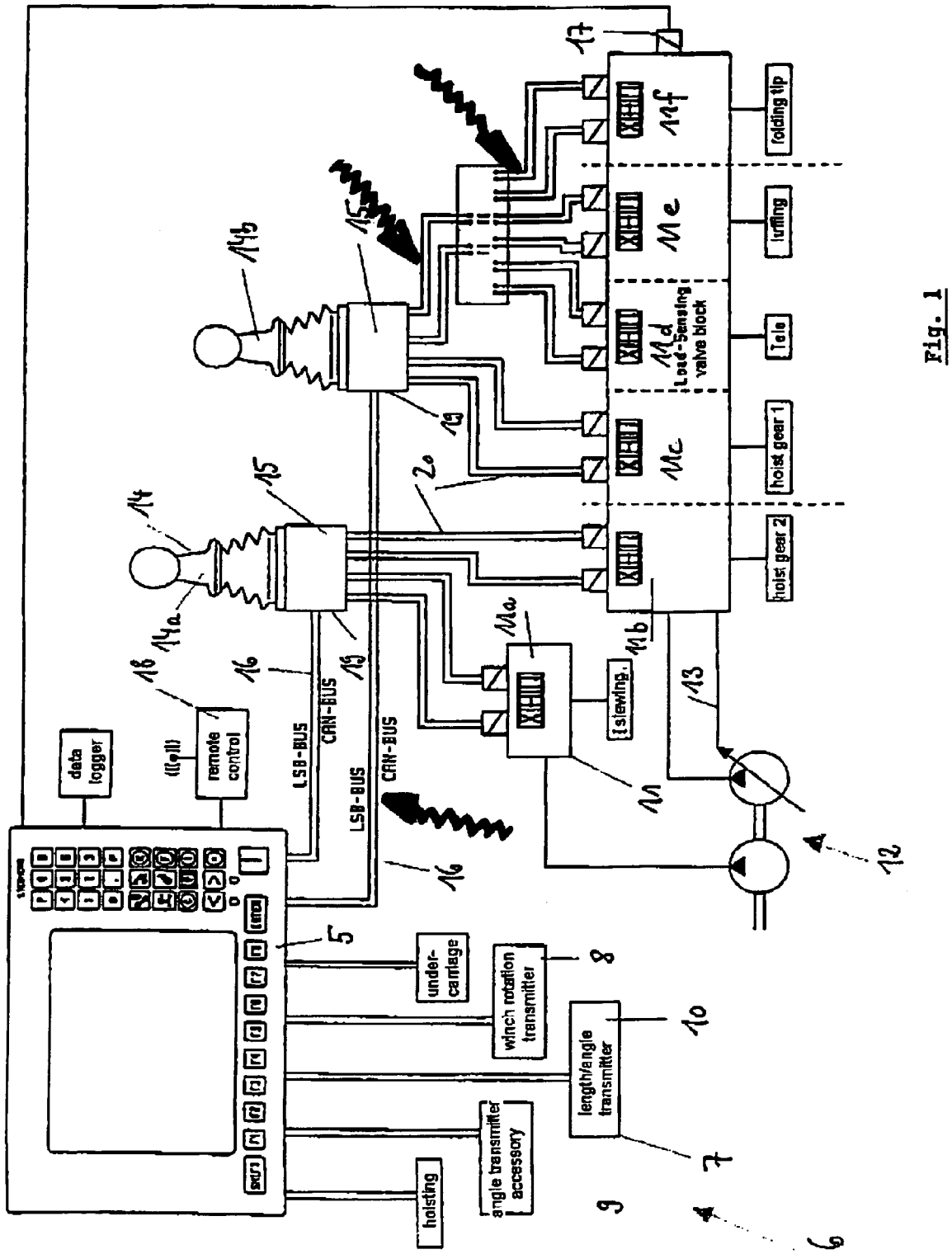
FIG. 1: shows a schematic circuit diagram of the control of a crane in accordance with a preferred embodiment of the invention.

As shown in FIG. 1, the crane 4 comprises a central crane control unit 5, which includes a main computer by means of which in particular a monitoring of the load capacity is performed and a superordinate control of the crane elements can be effected. The crane control unit 5 is provided with a sensor unit 6 for monitoring the movements of the crane elements as well as the loads. As shown in FIG. 1, the sensor unit 6 can comprise diverse sensors 7, which detect the position of the crane elements and/or of the actuators provided therefor as well as the loads acting on the crane elements. These sensors 7 can include for instance a winch rotation transmitter 8 associated to the hoisting winch, an angular rotation transmitter 9 associated to the slewing gear for rotating the uppercarriage 2 as well as a length/angle transmitter 10 for detecting the position of the telescopic. boom 3.

In the illustrated embodiment, the actuators each are of the hydraulic type, and their movement is controlled by one hydraulic valve 11 each. As shown in FIG. 1, there is provided one hydraulic valve 11a for the slewing gear, one hydraulic valve 11b for a second hoist gear, and one hydraulic valve 11c for a first hoist gear as well as one hydraulic valve 11d for the telescoping drive, one hydraulic valve 11e for the luffing drive as well as one hydraulic valve 11f for actuating the folding tip. The actuators are fed via hydraulic pumps 12, wherein advantageously a hydraulic pump of variable absorption volume can be used, in order to be able to adjust the hydraulic power, which can for instance be effected via a hydraulic feedback 13 of the consumers onto the actuating lever of the pump.

Said hydraulic valves 11 can be activated by two actuating switches 14 in the form of multiaxially movable control sticks. Said control sticks 14 each comprise a programmable logic module 15 with one activation end stage each, which allows to autonomously activate the hydraulic valves 11 by movements of the actuating switches 14. As shown in the Figure, the control outputs of the end stages of the respective logic module 15 are each connected with one of the hydraulic valves 11, so that a predetermined switch movement is converted by the logic module 15 into a corresponding positioning movement of the respective hydraulic valve 11. In the illustrated embodiment, the one actuating switch 14a is linked with the hydraulic valve 11a for the slewing gear and the hydraulic valve 11b for the second hoist gear, whereas the other actuating switch 14b is linked with the hydraulic valves 11c to 11f for the hoist gear, the telescoping drive, the luffing drive and the folding-tip drive. It will be appreciated, however, that this division can be made in a different way. In addition, the linkage can be changed as described above via a parametrization or reassignment of the control outputs by the central crane control unit 5.

Said central crane control unit 5 is connected with each of the two actuating switches 14 via one bus system 16 each, in order to execute the superordinate control functions described above and be able to intervene in the control function of the logic modules 15. Advantageously, the bus systems 16 each are of a two-channel type, in order to achieve redundance. In particular, a diversitary configuration is provided, which in the illustrated embodiment is implemented by an LSB bus and a CAN bus. Advantageously, the logic modules 15 also have two different types of microprocessor.

By means of the logic module 15 integrated in the actuating switch 14, the actuators can be actuated by the actuating switches 14 autonomously, i.e. without interconnection of the central crane control unit 15. On the other hand, the bus connection between the actuating switches 14 and the central control unit 5 allows a superimposed or superordinate control of the actuators by means of the central crane control unit 5. In detail, reference is made to the introductory description of the superordinate control functions executed by the central crane control unit 5.

Advantageously, the drive stages and/or connections between the actuating switches 14 and the hydraulic valves 11 are of a two-channel and/or diversitary type. The same is true for the connections between the sensors 7 and the central crane control unit 5. Both can be implemented by a differently configured two-channel bus system.

As is furthermore shown in FIG. 1, a safety valve 17 can be actuated directly via the central crane control unit 5, i.e. by bridging the actuating switches 14, in order to shut off for, instance the actuator when the load limits are reached. Via a remote control module 18, which is connected with the central crane control unit 5, a remote control of the actuators can be implemented via the crane control unit 5 and the bus system 16.

Figure 3:
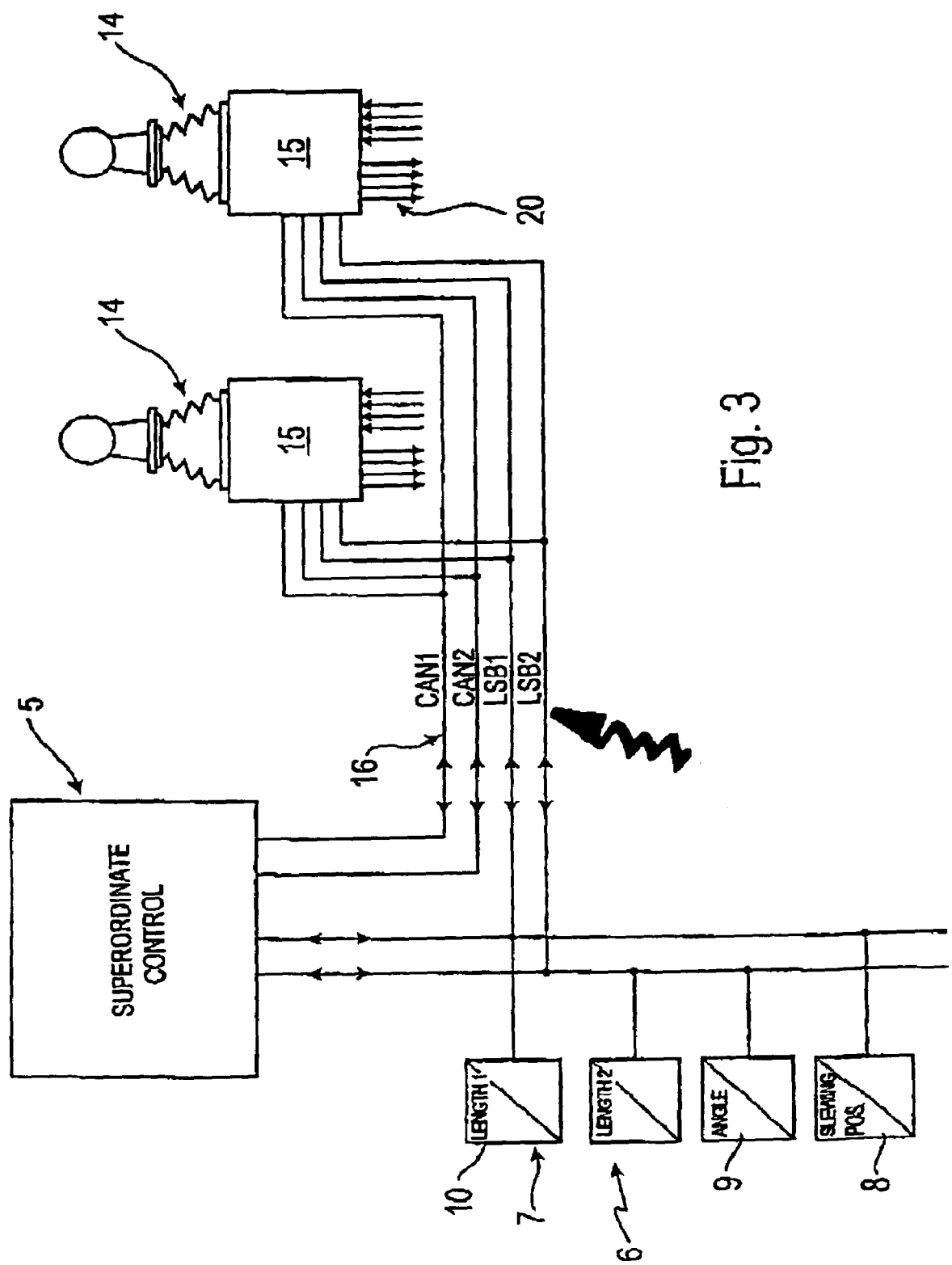
FIG. 3: shows a schematic circuit diagram of the control of a crane from the preceding Figure in accordance with another preferred embodiment of the invention, in which a plurality of crane sensors are connected with the logic modules of the actuating switches via one bus system each.

As shown in FIG. 3, the sensor unit 6 with its diverse sensors 7 cannot only be connected with the superordinate crane control unit 5, but also with the logic modules 15 of the actuating switches 14. In the embodiment illustrated in FIG. 3, the sensors 7 are connected with both logic modules 15 of the two actuating switches 14 via bus systems. In addition, the sensors 7 are also directly connected with the superordinate control 5 via corresponding bus systems. Due to the direct connection of the sensor unit 6 also to the logic modules 15, the same can process the sensor signals which they require for driving the actuators 11, possibly also by bypassing the superordinate control 5.

Figure 4:
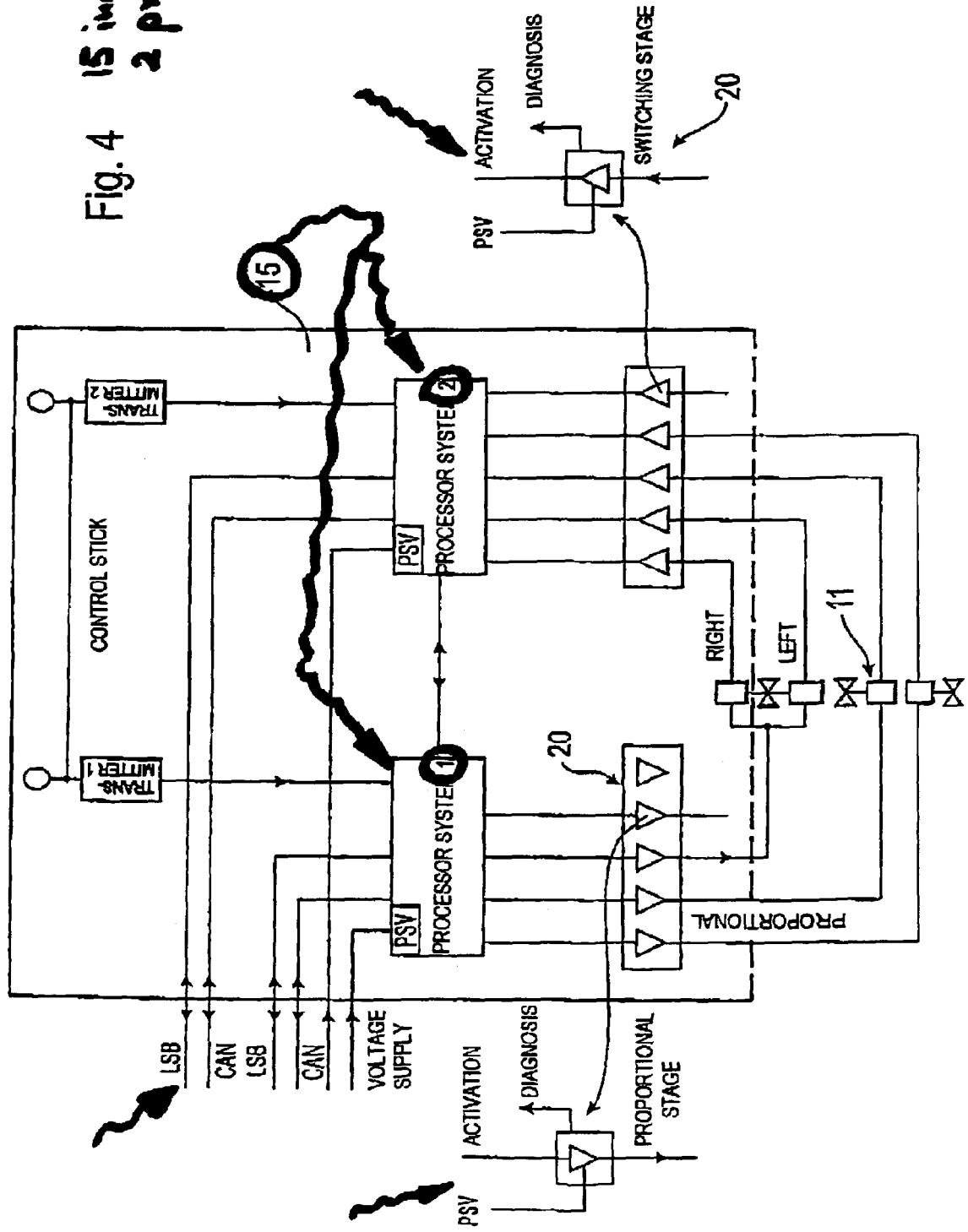
FIG. 4: shows a schematic circuit diagram of the control of a crane from FIG. 2 in accordance with another preferred embodiment of the invention, in which the logic modules of the actuating switches are connected with the valves of the actuators by a two-channel connection to which a diagnostic device is connected.

FIG. 4 illustrates a particular configuration of the drive of the actuators 11 by the logic modules 15, namely by a two-channel connection of the logic modules 15 with the corresponding valves of the actuators 11. FIG. 4 shows a logic module 15, wherein two processor systems receive a corresponding input from the control stick via one separate transmitter each, when the control stick is moved. Via proportional stages, the processor systems are connected with the respective valves of the actuators 11 in the illustrated way. To the proportional stages, diagnostic devices can be connected, as is shown in the enlarged representation of the proportional stages.

In the two-channel drive of the actuators, current control can advantageously be effected via one channel, whereas enabling is effected via the second channel. The drive preferably is configured such that both the flowing currents and the voltages applied can be read back whereby a high detection of errors, such as wire ruptures, short circuits, a wrong valve connection, etc., is achieved.

Figure 5:
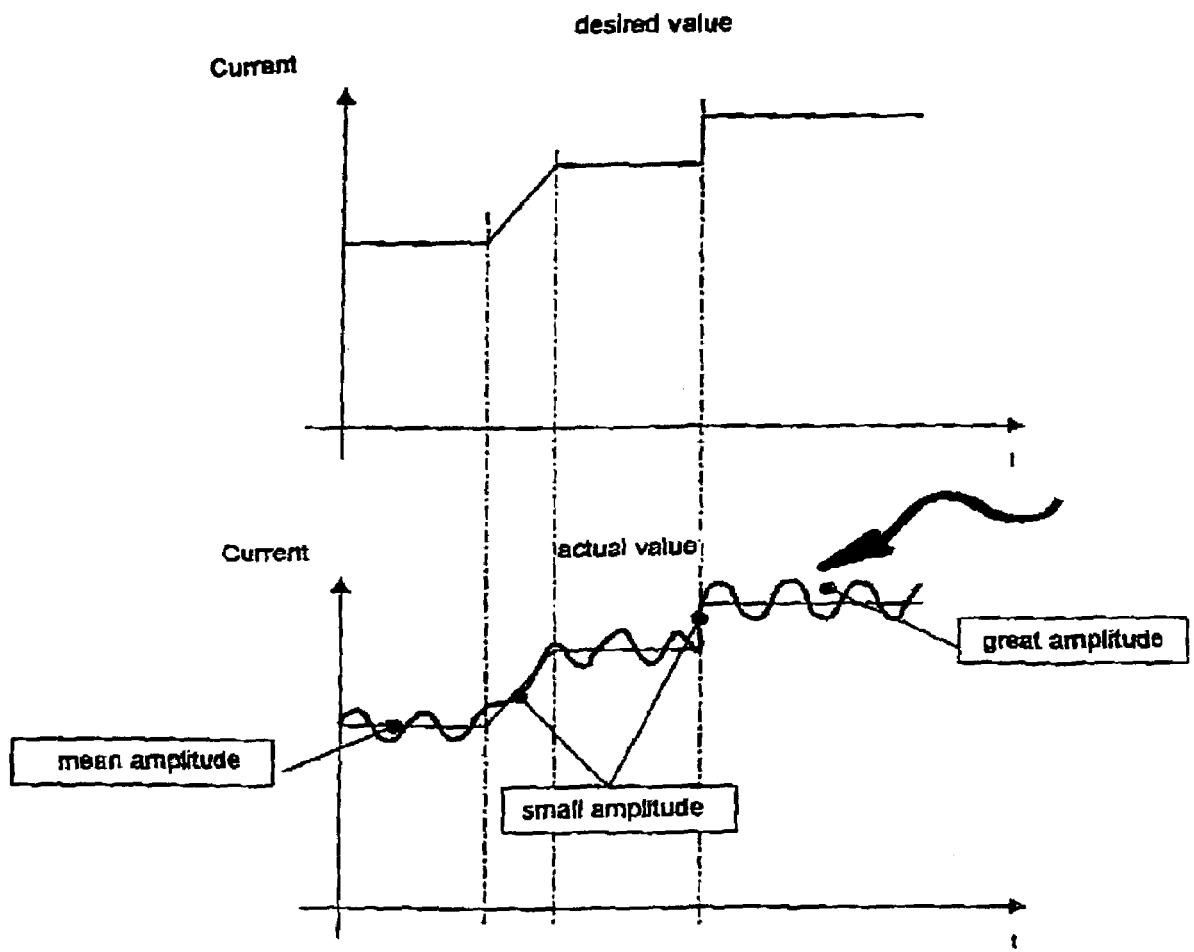
FIG. 5: shows a diagram of the time course of the drive current for an actuator, in which a constant current is provided, and via the constant current a dither with a frequency of variable amplitude is modulated and controlled.

As is illustrated in FIG. 5, the drive of the valves of the actuators 11 is effected such that a constant current is provided by means of a pulse width modulation with constant frequency and onto the same a dither with a frequency of variable amplitude is modulated and controlled. Preferably, a transient behavior of the dither is provided, so that the dither amplitude is influenced when the constant current is changed. As is shown by the lower representation of the actual value of the current in accordance with FIG. 5, various dither amplitudes are superimposed on the drive current. In the first portion of constant drive current, a mean dither amplitude is provided, whereas in the succeeding portions a small amplitude is provided. Finally, a large amplitude is provided in the illustrated last portion of the current path.

In this way, an optimum, sensitive dynamic drive of a respective hydraulic valve of an actuator 11 is possible with an optimized hysteresis.

To achieve that the flowing currents and the voltages applied can be read back as mentioned above, the control can include means for recording the respectively flowing currents and the voltages applied as well as means for allocating the recorded values to one or more control commands, so that it can be checked or read back into which currents and which voltages a respective control command has been converted. This provides for a complete error diagnosis. Advantageously, the recorded current and voltage values allocated to the control commands are provided so as to be retrievable from the control, so that they can be read out via a control interface or can possibly also be displayed by the control itself.

Preferably, between the logic module 15 and the actuators there is each provided a two-channel or multi-channel and/or diversitary driving stage and/or data and/or signal transmission connection 20. The crane control unit preferably includes a curve-changing module for changing the signal course provided by the logic module 15 of the actuating switch 14. Additionally, the crane control unit 5 preferably includes an allocation module, by which the signals provided by the logic module 15 of the actuating switch 14 can be withdrawn from an actuator of the crane and be supplied to another actuator.

The invention claimed is:

1. A crane, comprising
a plurality of crane elements which are movable,
actuators arranged to move the crane elements,
a crane control unit for at least one of controlling and monitoring the movement of the crane elements, and
at least one actuating switch for actuating the actuators, wherein in the at least one actuating switch, a logic module is integrated, by which the actuators are directly drivable corresponding to a respective switch movement,
the logic module is connected with a plurality of sensors for at least one of detecting crane movements, monitoring crane movements, detecting load conditions and monitoring load conditions,
the logic module effective to directly drive the actuators based on sensor signals received from the plurality of sensors, and
the crane control unit is connectable with the logic module by a data transmission connection.

2. The crane as claimed in claim 1, wherein the actuating switch constitutes a multiaxially movable, control stick and includes at least one bus connection for communication with the crane control unit.

3. The crane as claimed in claim 1, wherein the logic module is of the diversitary type and has two different types of processors.

4. The crane as claimed in claim 1, wherein the data transmission connection between the crane control unit and the logic module is a two-channel or multi-channel bus system which has a diversitary structure.

5. The crane as claimed in claim 1, wherein between the logic module and the actuators, there is each provided at least one of a two-channel signal transmission connection, multi-channel signal transmission connection, diversitary driving stage, data signal transmission connection and signal transmission connection.

6. The crane as claimed in claim 1, wherein the logic module is configured to be driveable and parametrizable by the crane control unit.

7. The crane as claimed in claim 1, wherein the logic module has at least one signal output, which is limitable by the crane control unit.

8. The crane as claimed in claim 1, wherein the crane control unit includes a parametrization module for parametrizing signals provided by the logic module of the actuating switch.

9. The crane as claimed in claim 1, wherein the crane control
unit is effective to change signal course provided by the logic module of the actuating switch using integration.

10. The crane as claimed in claim 1, wherein the crane control unit is effective to change signal course provided by the logic module of the actuating switch using curve changing.

11. The crane as claimed in claim 1, wherein the crane control unit is effective to disable signals provided by the logic module of the actuating switch.

12. The crane as claimed in claim 1, wherein the crane control unit is effective to withdraw signals provided by the logic module of the actuating switch from an actuator of the crane and supply the signals provided by the logic module to another actuator.

13. The crane as claimed in claim 1, wherein the crane control unit is effective to enable at least one of characteristics and drive functions stored in the logic module.

14. The crane as claimed in claim 1, wherein a vibrator is provided on the actuating switch, which is configured to be parametrizable via a bus connection of the actuating switch.

15. The crane as claimed in claim 1, wherein the logic module includes at least one microprocessor into which an application program can be imported via a bus connection of the actuating switch.

16. The crane as claimed in claim 1, wherein a priority control is provided in at least one of the logic module and crane control unit, such that in the case of the simultaneous existence of a control command signal from the actuating switch and a control signal from the crane control unit, a smaller one of the two control signals has priority.

17. The crane as claimed in claim 1, wherein superimposed control functions are provided in the crane control unit for at least one of completing, modifying and replacing control functions stored in the logic module of the actuating switch.

18. The crane as claimed in claim 1, wherein the crane control unit is connected with a plurality of sensors for at least one of detecting and monitoring at least one of crane movements and load conditions.

19. The crane as claimed in claim 1, wherein the actuators are hydraulic and each controllable by at least one hydraulic valve which is activatable by the logic module of the at least one actuating switch.

20. The crane as claimed in claim 1, wherein the logic module is connected with the plurality of sensors via at least one bus system.

21. The crane as claimed in claim 1, wherein at least one of the logic module and crane control unit includes drive means for a multi-channel drive of the actuators, the drive means comprising a first channel for at least one of current regulation and control and a second channel for enabling.

22. The crane as claimed in claim 1, wherein a drive of the actuators is configured such that a constant current is provided by a pulse width modulation with constant frequency and via constant current a dither with a frequency of variable amplitude is modulated and controlled.

23. The crane as claimed in claim 22, wherein a change of a dither amplitude is provided when the constant current is changed.

24. The crane as claimed in claim 23, wherein the dither amplitude is changeable in dependence on a change of the constant current.

25. The crane as claimed in claim 1 wherein a drive of the read-back is provided for the actuators.

26. The crane as claimed in claim 25, further comprising means for recording currents and/or voltages provided by a drive of the actuators and allocating at least one of the currents and voltages to a respective control command.

27. The crane as claimed in claim 1, wherein the actuating switch constitutes a multiaxially movable control stick.

28. The crane as claimed in claim 27, wherein the control stick is tiltable.

29. The crane as claimed in claim 1, wherein the actuating switch includes at least one bus connection for communication with the crane control unit.

* * * * *